Sept. 7, 1965     R. HUBER     3,204,614
ROTARY-PISTON INTERNAL COMBUSTION ENGINE
Filed Aug. 30, 1961     2 Sheets-Sheet 1
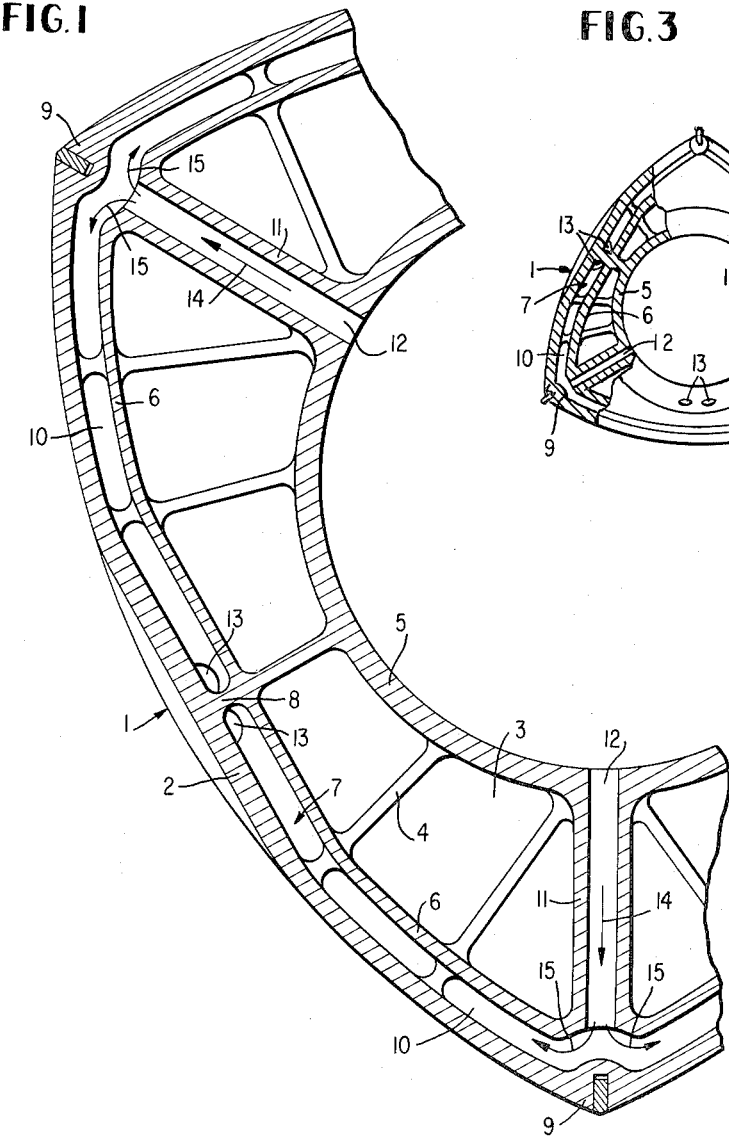
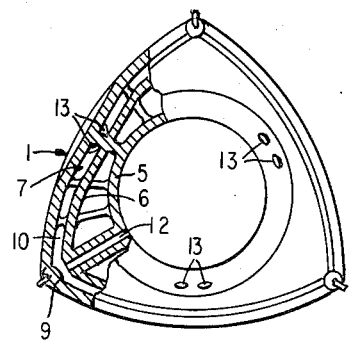
*INVENTOR.*
REINHOLD HUBER
BY Dicke and Craig
*ATTORNEYS*

Sept. 7, 1965　　　　　　R. HUBER　　　　　　3,204,614
ROTARY-PISTON INTERNAL COMBUSTION ENGINE
Filed Aug. 30, 1961　　　　　　　　　　　　　2 Sheets-Sheet 2

INVENTOR.
REINHOLD HUBER
BY
*Dicke and Craig*
ATTORNEYS

United States Patent Office 3,204,614
Patented Sept. 7, 1965

3,204,614
ROTARY-PISTON INTERNAL COMBUSTION ENGINE
Reinhold Huber, Esslingen-Zollberg, Germany, assignor to Daimler-Benz Aktiengesellschaft, Stuttgart-Unterturkheim, Germany
Filed Aug. 30, 1961, Ser. No. 134,925
Claims priority, application Germany, Sept. 7, 1960, D 34,186
6 Claims. (Cl. 123—8)

The present invention relates to a polygonal piston adapted to be cooled by means of a cooling liquid, especially by means of oil, within a rotary-piston internal combustion engine of trochoidal construction.

Pistons in internal combustion engines of this type are subjected normally to high thermal and mechanical loads by reason of the relatively large surfaces which are exposed to the prevailing hot combustion gases so that an intensive cooling and a good construction of the piston as regards sturdiness is required to assure proper operation. It is possible by the use of the present invention which essentially consists in providing a piston having on the inside thereof a wall extending substantially parallelly and at a relatively small distance to the piston outer wall and forming with the piston outer wall a space to which the cooling fluid is supplied at a plurality of places and from which the cooling fluid may also escape at a plurality of places, to achieve a cooling system with relatively small expenditures satisfying even the most severe operating conditions.

Accordingly, it is an object of the present invention to provide a cooling system for the piston of a rotary piston internal combustion engine, especially a polygonal piston for a rotary piston internal combustion engine of trochoidal construction, which obviates the shortcomings of the prior art constructions and provides an effective cooling for the exposed piston walls in a simple, inexpensive and reliable manner.

Another object of the present invention resides in the provision of a piston construction for a polygonal piston of a rotary piston internal combustion engine which is so constructed as to provide cooling spaces directly adjacent the outer piston walls, normally exposed to the high combustion gases to thereby assure adequate cooling even under maximum-load conditions.

Still a further object of the present invention resides in the provision of a cooling system for an internal combustion engine in which the cooling effect is so correlated to the thermal loads that occur within the piston as to effectively eliminate peak stresses throughout the piston.

Still a further object of the present invention resides in the provision of a polygonal piston for a rotary-piston internal combustion engine of trochoidal construction in which maximum cooling is obtained near the corners or apices of the polygonal piston.

Another object of the present invention resides in the provision of cooling system utilizing a liquid, such as oil, for a polygonal rotary piston of a rotary-piston internal combustion engine of trochoidal construction which enables a continuous free flow of the cooling liquid in heat exchange relationship with the exposed piston walls without endangering the mechanical strength of the piston.

These and other objects, features and advantages of the present invention will become more obvious from the following description when taken in connection with the accompanying drawing which shows, for purposes of illustration only, one embodiment in accordance with the present invention and wherein:

FIGURE 1 is a partial cross sectional view through a rotary piston in accordance with the present invention, the cross section being taken in a plane at right angle to the piston axis;

FIGURE 3 is a transverse cross sectional view through a polygonal liquid-cooled piston in accordance with the present invention.

Figure 2:
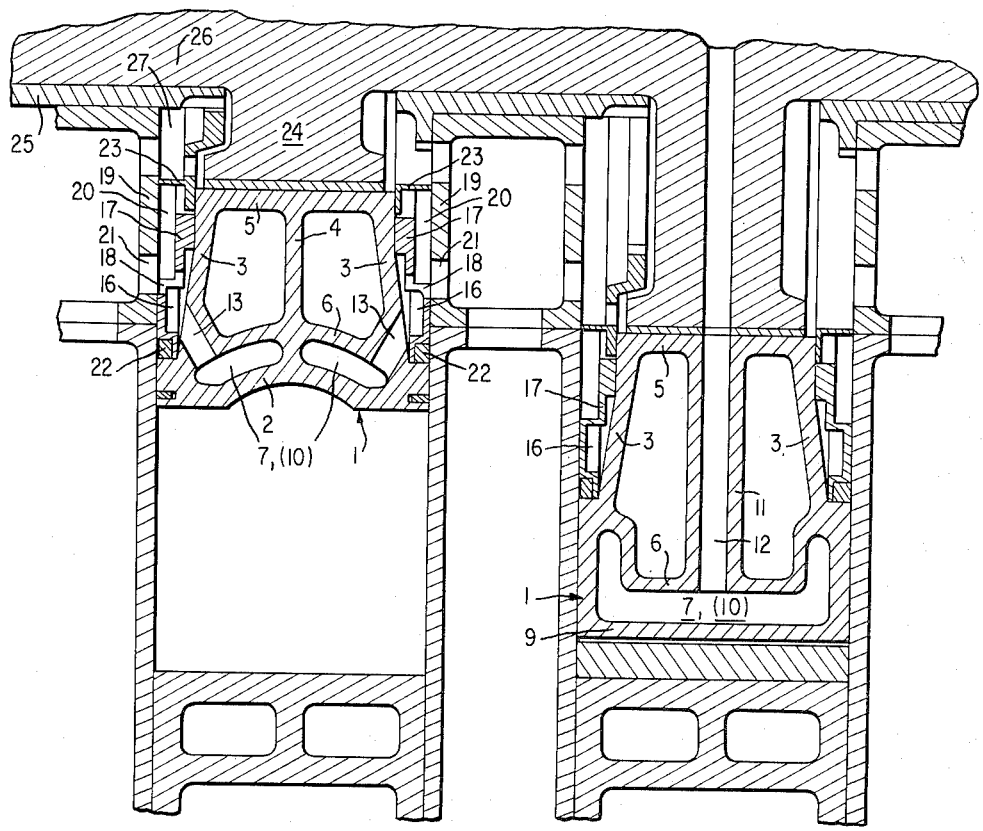
FIGURE 2 is a partial longitudinal cross sectional view through an internal combustion engine provided with two pistons in accordance with the present invention.

Referring now to the drawing wherein like reference numerals are used throughout the three views to designate corresponding parts, and more particularly to FIGURE 1, reference numeral 1 generally designates therein the piston for a rotary-piston internal combustion engine of trochoidal construction. The outer wall 2 of the piston 1 which comes into contact with the hot combustion gases is connected with the wall portions 5 constituting the bearing of the piston 1, by the side walls 3 and additionally by webs 4, ribs or the like. Parallelly to the outer wall 2 and at a relatively small distance with respect thereto is arranged within the piston 1 the wall 6 which forms together with the outer wall 2 and the adjoining parts of the side walls 3 the space generally designated by reference numeral 7 for the accommodation of oil for cooling purposes. The space 7 is subdivided in the center between two respective piston corners 9 into two completely separate individual spaces 10 by means of separating walls 8 extending in the axial direction of the piston 1. Each individual space 10 is provided, for purposes of supplying the cooling oil, with bores 12 disposed within the web portions 11 extending in the radial direction from the bearing wall 5 toward the respective piston corner 9 whereas for purposes of discharging the cooling oil bores 13 are provided in the side walls 3 within each space 10 in proximity to the separating walls 8.

The cooling oil flowing through the bores 12 in the direction of arrows 14 at first impinges against the outer wall 2 within the area of the thermally highly-loaded or stressed piston corners 9 and is distributed thereupon in the direction of arrows 15 into respective individual spaces 10 whereby the cooling oil supplied to a respective piston corner 9 through a corresponding bore 12 leaves the individual spaces 10 on both sides of the respective piston corner 9 through the corresponding bores 13.

As will become more clear from FIGURE 2, the bores 13 lead through the side walls 3 of the piston 1 into the annular spaces 16 which are formed on both sides of the piston by the side walls 3 thereof and the parts 17 machined by turning mounted on or joined to the side walls 3 of the piston. Apertures 18 within the parts 17 make it possible for the cooling oil to flow from the annular spaces 16 into the spaces 20 enclosed by the side walls 3 of the piston and the walls 19 of the internal combustion engine housing and to flow off from there through the bores 21 into the discharge, such as the sump or the like. Sealing elements 22 prevent any cooling oil, when flowing past the piston outwardly in the radial direction, from reaching the combustion space. Separating webs 23 at the piston side walls 3 in proximity to the bearing of the piston 1 prevent any further loading of the sealing elements 22, in addition to loading by the oil present within spaces 20, by the lubricating oil which reaches the spaces 27 from the bearing of the piston on the eccentric 24 and from the bearings 25 of the shaft.

While I have shown and described one embodiment in accordance with the present invention, it is obvious that the same is not limited thereto but is susceptible of many changes and modifications within the spirit and scope thereof, and I, therefore, do not wish to be limited to the details shown and described herein, but intend to cover all such changes and modifications as are encompassed by the scope of the appended claims.

I claim:

1. A polygonal liquid-cooled piston having a plurality of corners, comprising outer piston wall means, further wall means within said piston disposed substantially parallel to and at a relatively small distance with respect to said outer piston wall means, said two wall means forming therebetween a space for receiving the cooling liquid which extends over a substantial portion of the width of the piston in the axial direction thereof, means for supplying cooling liquid to said space substantially in radial directions at said plurality of corners, and means enabling the discharge of said cooling liquid from said space at a plurality of places intermediate neighboring corners.

2. A polygonal liquid-cooled piston, comprising outer piston wall means disposed about an axis, said wall means being of a polygonal shape in a plane normal to said axis and having an axial extent, said polygon having a plurality of corners, further wall means within said piston disposed substantially parallel to and at a relatively small distance with respect to said outer piston wall means, said two wall means forming therebetween a space for receiving the cooling liquid, said space having a width considerably larger than the depth thereof and a length substantially greater than the width thereof, means located intermediate each pair of corners and disposed to divide said space into a plurality of separate, adjoining spaces, supply means for supplying cooling liquid to said space at a plurality of places, including radial bore means from the piston center through said further wall means at each of said corners of said polygon for supplying said cooling liquid to each of said separate spaces, and discharge means enabling the discharge of said cooling liquid from each of said separate spaces at a plurality of places including discharge bore means disposed within said further piston wall portion which is located adjacent said dividing means which separates one of said spaces from the next adjoining space.

3. A polygonal liquid-cooled piston, especially for a rotary-piston internal combustion engine of trochoidal construction, comprising outer piston wall means disposed about an axis, said wall means being of a polygonal shape in a plane normal to said axis and having an axial extent, said polygon having a plurality of corners, further wall means within said piston disposed substantially parallel to and at a relatively small distance with respect to said outer piston wall means, said two wall means forming therebetween a space narrow in a radial direction and relatively wide in an axial direction, said space extending over a substantial portion of the axial width of the piston for receiving the cooling liquid, means located intermediate each pair of corners and disposed to divide said space into a plurality of separate, adjoining spaces, bearing wall means disposed about said axis, substantially radially extending rib means and web means interconnecting said bearing wall means and said further wall means, and still further wall means reinforcingly interconnecting said piston wall means and said bearing wall means, supply means including radial bore means for supplying cooling liquid from the piston center through said further wall means at each of said corners of said polygon, and discharge means enabling the discharge of said cooling liquid from each of said separate spaces at a plurality of places located about mid-way between two corners and including discharge bore means disposed within said further wall portion adjacent said dividing means separating one of said spaces from the next adjoining space, said discharge bore means discharging into annular spaces disposed on both axial sides of said piston.

4. A polygonal liquid-cooled piston for a rotary piston internal combustion engine, comprising outer piston wall means, further wall means within said piston disposed substantially parallel to and at a relatively small distance with respect to said outer piston wall means, said two wall means forming therebetween a space for receiving therein the cooling liquid, substantially axially disposed subdividing wall means disposed each between two respective corners of said piston for subdividing said space into a plurality of individual space portions, supply means including radial bore means leading from the piston center to a respective piston corner for supplying cooling liquid to said space at a plurality of places, and discharge means located near said subdividing wall means enabling the discharge of said cooling liquid from said space a plurality of places, each space portion being provided with at least one discharge means.

5. A polygonal liquid-cooled piston, comprising outer piston wall means, further wall means within said piston disposed substantially parallel to and at a relatively small distance with respect to said outer piston wall means, said two wall means forming therebetween a space for receiving therein the cooling liquid, substantially axially disposed subdividing wall means disposed each about mid-way between two respective corners of said piston for subdividing said space into a plurality of individual space portions, supply means including radial bore means leading from the piston center to a respective piston corner for supplying cooling liquid to said space at the corners thereof, and discharge bore means enabling the discharge of said cooling liquid from said space at a plurality of places, each space portion being provided with at least one discharge bore means disposed in the subdividing wall means separating the space from the next adjoining space, said discharge bore means terminating in annular spaces disposed on both sides of said piston and effectively formed by the piston side walls.

6. A polygonal liquid-cooled piston, especially for a rotary piston internal combustion engine of trochoidal construction, comprising outer piston wall means disposed about an axis, said wall means being of a polygonal shape in a plane normal to said axis and having an axial extent, said polygon having a plurality of corners, bearing wall means, further wall means within said piston disposed substantially parallel to and at a relatively small distance with respect to said outer piston wall means, said outer piston and further wall means forming therebetween a space for receiving therein the cooling liquid which has a width substantially in the direction of the axis of the piston several times the depth substantially in the radial direction thereof, substantially axially disposed subdividing wall means disposed intermediate each pair of corners of said piston for subdividing said space into a plurality of individual space portions, substantially radially extending reinforcing wall means interconnecting said outer wall means with said further wall means and with said bearing wall means, supply means including radial bore means leading from the piston center through said further wall means at each of said corners of said polygon for supplying cooling liquid to said space at the corners thereof, and discharge bore means enabling the discharge of said cooling liquid from each of said individual space portions at a plurality of places, each space portion being provided with at least one discharge bore means disposed in the subdividing wall means separating the space from the next adjoining space, said discharge bore means terminating in annular spaces disposed on both axial sides of said piston and effectively formed at least in part by the piston side walls.

References Cited by the Examiner
UNITED STATES PATENTS

| | | | |
|---|---|---|---|
| 990,742 | 4/11 | Jacobs | 123—8 |
| 1,228,806 | 6/17 | Morris | 123—8 |
| 1,536,851 | 5/25 | Hewitt | 123—8 |
| 1,611,213 | 12/26 | Lucich | 123—8 |
| 2,070,631 | 2/37 | Sunderland | 123—8 |
| 2,075,561 | 3/37 | Wellensiek | 123—8 |
| 2,175,265 | 10/39 | Johnson | 123—8 |
| 2,808,813 | 10/57 | Lindhagen et al. | 123—8 |

FOREIGN PATENTS

| | | |
|---|---|---|
| 214,206 | 3/61 | Austria. |
| 625,397 | 8/61 | Canada. |

KARL J. ALBRECHT, *Primary Examiner.*
RALPH H. BRAUNER, JOSEPH H. BRANSON, Jr.,
*Examiners.*